UNITED STATES PATENT OFFICE

HEINRICH CLINGESTEIN, OF COLOGNE, AND KARL DOBMAIER, OF LEVERKUSEN-ON-THE-RHINE, GERMANY, ASSIGNORS TO GENERAL ANILINE WORKS, INC., OF NEW YORK, N. Y., A CORPORATION OF DELAWARE

WATER-INSOLUBLE MONOAZO DYESTUFF

No Drawing. Application filed December 4, 1929, Serial No. 411,670, and in Germany December 5, 1928.

The present invention relates to new water-insoluble monoazodyestuffs and to the fiber dyed therewith.

In accordance with the present invention, water-insoluble monoazodyestuffs, dyeing, when produced on the fiber, red shades are obtainable by coupling with a 2.3-hydroxy-naphthoic acid arylamide which is not substituted by a carboxylic acid-, sulfonic acid or hydroxy group, a diazo compound of an ortho-aminobenzophenone, which may be substituted in the nuclei with the exception of a carboxylic acid-, sulfonic acid- or hydroxy group, for example by halogen, methyl, methoxy.

Our new dyestuffs may be represented by the following general formula:

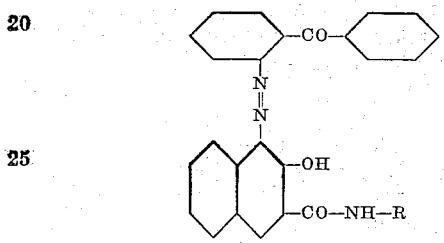

wherein R stands for an aromatic nucleus of the benzene or naphthalene nucleus, and wherein the benzene nuclei and R may be further substituted by halogen, alkyl or alkoxy.

In their dry pulverized form, the new dyestuffs are generally red powders; they are insolube in water, soluble in sulfuric acid and yield upon reduction with stannous chloride and hydrochloric acid the starting ortho-aminobenzophenone and a 1-amino-2.3-hydroxynaphthoic acid arylide. The dyeings prepared on the fiber are distinguished by an excellent fastness to washing, chlorine and kier boiling.

In preparing the dyestuffs on the fiber, especially on cotton, the material to be dyed is impregnated with a grounding liquor, containing the 2.3-hydroxy-naphthoic acid arylide, centrifuged, wrung, and developed for about ½ hour in a diazo bath, rinsed, soaped at boiling temperature, rinsed and dried.

For dyeing 50 grams of cotton, the grounding liquor is prepared by dissolving together about ½ gram to about 5 grams of the 2.3-hydroxynaphthoic acid arylide, about 1 to about 10 cc caustic soda lye of 34° Bé, and about 1 to about 10 cc Turkey red oil of 50% strength, and making up the whole with water to 1 liter.

The developing bath is prepared by diazotizing about 1 gram to about 3 grams of the ortho-aminobenzophenone with about 1 to about 3 cc of hydrochloric acid of 22° Bé. and about 3 to about 9 cc of a 10 per cent sodium nitrite solution, while cooling with ice. When diazotization is complete, the liquid is neutralized with about 4 to about 20 cc of a 20 per cent sodium acetate solution, whereupon 10 grams of common salt are added, and the whole is made up with water to 1 liter.

The following examples serve to illustrate our invention, without limiting it thereto.

*Example 1.*—Well boiled and dried cotton yarn is impregnated with an alkaline solution containing per liter:—

12 grams of 2:3-hydroxynaphthoic acid naphthalide, 20 cc. of caustic soda 34° Bé., 25 cc. of Turkey red oil wrung out and developed without drying in a bath of diazotized-ortho-aminobenzophenone to which sodium acetate has been added. The cotton is thereby dyed an intense pure red shade. The dyeing is remarkably fast to light, kier boiling, chlorine and washing. The dyestuff has the probable formula:

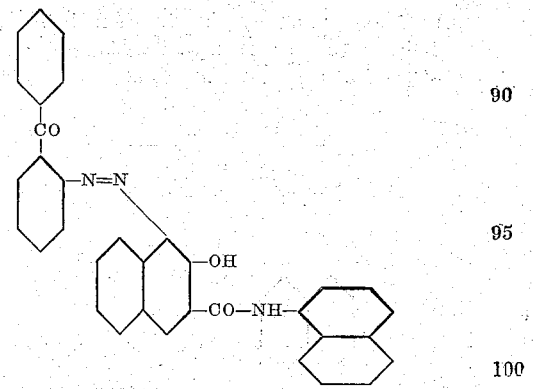

*Example 2.*—When using as components 4-chloro-2-aminobenzophenone

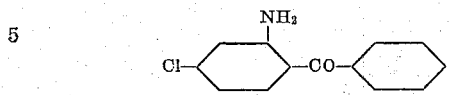

(prepared from 4-chloro-2-para-toluenesulfamido-1-benzoic acid-chloride and benzene by means of aluminium chloride according to the Friedel-Craft's reaction and saponifying the 4-chloro-2-para-toluenesulfamido-diphenylketone with sulfuric acid) and 2.3-hydroxynaphthoic-acid-4'-chloro-2'-methyl-anilide, a bright scarlet shade is obtained. The dyestuff has the probable formula:

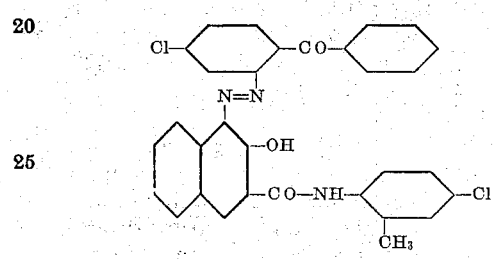

The 4-chloro-2-para-toluenesulfamido-1-benzoic acid chloride mentioned above is prepared by treating 4-chloro-2-amino-benzoic acid with para-toluene sulfo-chloride in soda alkaline solution until the product does not more react with nitrous acid. Then the condensation product is filtered, dried and treated in benzene solution with thionylchloride; the benzene is distilled off and the 4-chloro-2-para-toluenesulfamido-1-benzoic acid chloride is distilled in vacuo.

*Example 3.*—19.7 parts by weight of ortho-aminobenzophenone are stirred with 30 parts by weight of hydrochloric acid of 20° Bé., dissolved in 1000 parts of water and diazotized with 6.9 parts by weight of sodium nitrite. After 15 minutes the mixture is neutralized with 15 parts by weight of sodium acetate, and 50 parts by weight of sodium chloride are then added. The diazosolution is introduced into an alkaline solution of 26.5 parts by weight of 2:3-hydroxynaphthoic acid anilide in caustic soda. The dyestuff, having the formula:

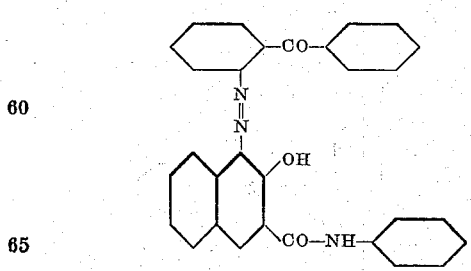

separates in the form of red flakes. When dry it is a red powder, insoluble in water, soluble in sulfuric acid with a bluish-violet coloration and in pyridine with an orange coloration.

We claim:—

1. As new products the monoazodyestuffs of the general formula:

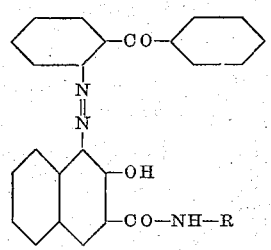

wherein R stands for an aromatic nucleus of the benzene or naphthalene series and wherein the nuclei may be substituted by halogen, alkyl or alkoxy, said dyestuffs being in their dry pulverized form red powders, insoluble in water, soluble in sulfuric acid and yielding upon reduction with stannous chloride and hydrochloric acid the starting ortho-aminobenzophenone and a 1-amino-2.3-hydroxynaphthoic acid arylide, and dyeing when produced on the fiber red shades which are distinguished by an excellent fastness to washing, chlorine and kier boiling.

2. As new products the monoazodyestuffs of the general formula:—

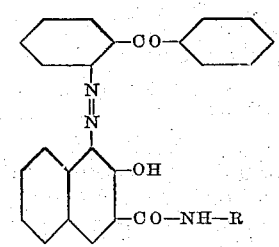

wherein R stands for an aromatic nucleus of the benzene or naphthalene series which may be substituted by halogen, alkyl or alkoxy, said dyestuffs being in their dry pulverized form red powders, insoluble in water, soluble in sulfuric acid and yielding upon reduction with stannous chloride and hydrochloric acid the starting ortho-aminobenzophenone and a 1-amino-2.3-hydroxynaphthoic acid arylide, and dyeing when produced on the fiber red shades which are distinguished by an excellent fastness to washing, chlorine and kier boiling.

3. As a new product the monoazodyestuff of the formula:

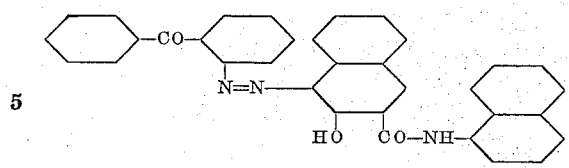

being in its dry pulverized form a red powder, insoluble in water, soluble in sulfuric acid and yielding upon reduction with stannous chloride and hydrochloric acid the starting ortho-amino-benzophenone and 1-amino - 2.3 - hydroxynaphthoic acid-α-naphthylamide, the pure red dyeings prepared on the fiber being distinguished by an excellent fastness to washing, chlorine and kier boiling.

4. As new products of manufacture cotton fiber dyed with a dyestuff as claimed in claim 1.

5. As new products of manufacture cotton fiber dyed with a dyestuff as claimed in claim 2.

6. As new products of manufacture cotton fiber dyed with the dyestuff as claimed in claim 7.

7. As a new product the monoazodyestuff of the formula:

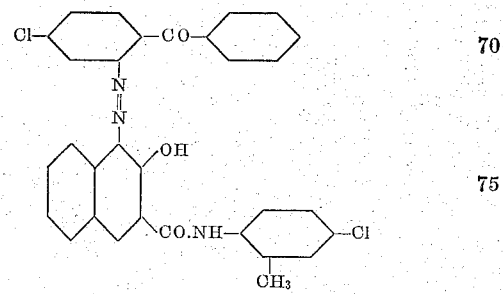

being in its dry pulverized form a red powder, insoluble in water, soluble in sulfuric acid and yielding upon reduction with stannous chloride and hydrochloric acid in the starting orthoaminobenzophenone and 1-amino-2.3-hydroxynaphthoic acid 4'-chloro-2'-methyl-anilide, the scarlet dyeings prepared on the fiber being distinguished by an excellent fastness to washing, chlorine and kier boiling.

In testimony whereof, we affix our signatures.

HEINRICH CLINGESTEIN. [L. S.]
KARL DOBMAIER. [L. S.]